Sept. 12, 1950  H. W. TAYLOR  2,521,808
APPARATUS FOR FORMING HEAT ACTIVATABLE
MATERIAL BY DIELECTRIC HEATING
Filed May 26, 1947
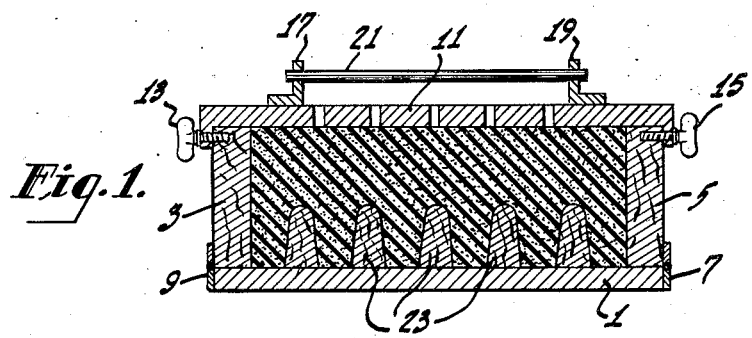
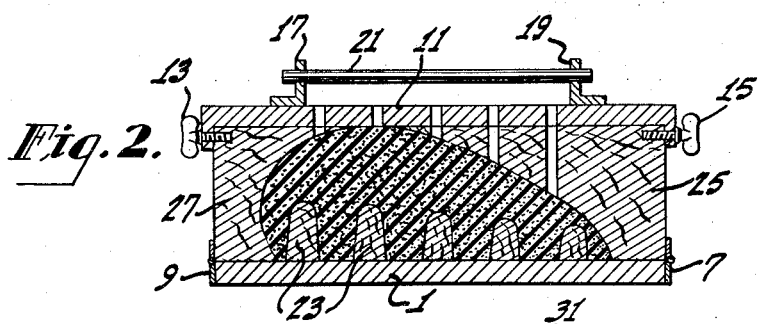
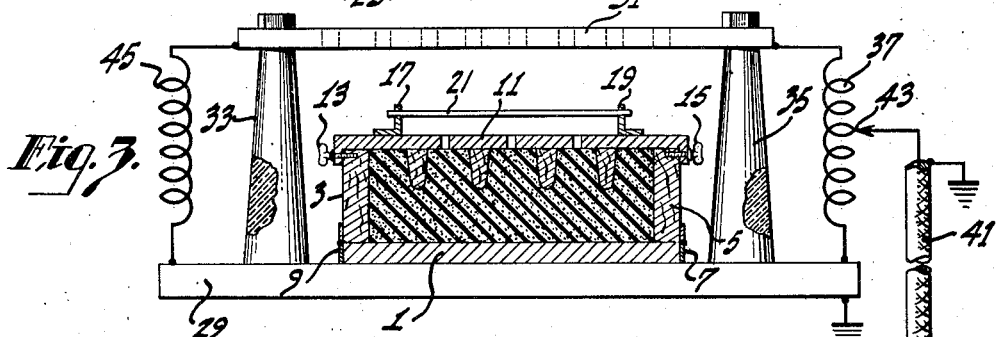
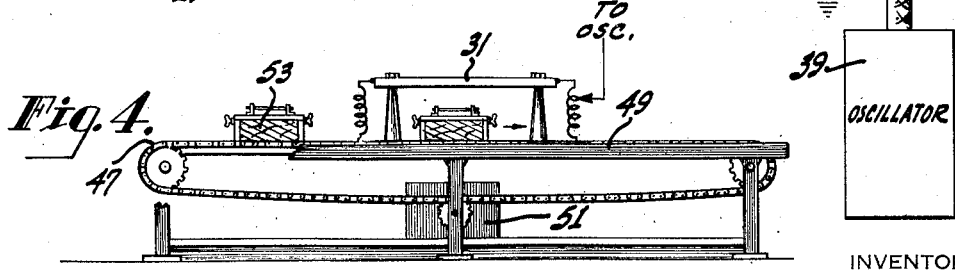
INVENTOR.
HARRY W. TAYLOR
BY
ATTORNEY Patented Sept. 12, 1950

2,521,808

UNITED STATES PATENT OFFICE 2,521,808

APPARATUS FOR FORMING HEAT ACTIVATABLE MATERIAL BY DIELECTRIC HEATING

Harry W. Taylor, West Collingswood, N. J., assignor to Radio Corporation of America, a corporation of Delaware Application May 26, 1947, Serial No. 750,464

5 Claims. (Cl. 219—47)

This invention relates to an arrangement for heating moldable dielectric material, and particularly to a device for heating liquid rubber latex in a substantially closed mold to effect vulcanization or coagulation and to produce, for example, a molded sponge rubber article.

It is well known that certain materials may be treated to change their physical condition by subjecting them to the effects of an intense alternating electric field. Dufour has suggested, in U. S. Patent No. 2,188,625, for example, that liquid latex may be made to flow through a vessel between the electrodes of an electric condenser connected to a source of high frequency power. In one form of the prior art the applicator electrodes are in contact with the liquid and form the walls of the vessel, while in another form the liquid is contained in a vessel of insulating material, such as ceramic or glass, which is placed between the electrodes.

Great difficulty has been experienced in attempting to apply previously known methods to the treatment of liquid latex in a mold to form sponge rubber mattresses, seats and the like, or to form large "blankets" as they are known, which are used in the subsequent manufacture of smaller articles.

An explanation of the lack of commercial success is believed to be that the electrical resistance of the wet liquid latex is relatively low. Consequently, when a large area of the liquid is in contact with the opposed electrodes, the electrical resistance of the load is so low that it is impossible to produce an effective transfer of energy into the load. To heat such material effectively, it is necessary to establish a high potential between the electrodes, and any attempt to match the load impedance to the impedance of the oscillator by coupling transformers in accordance with conventional practices, reduces the available voltage in like degree and is thus ineffective.

The alternative arrangement, shown by Dufour, for example, in which the material is contained in a vessel which is not in contact with the electrodes increases the effective load impedance by reason of the air gap between the applicator electrodes and the material, but it has heretofore been considered necessary to employ a glass or ceramic vessel to contain the material. This procedure has met with little commercial acceptance due to the fragile nature of such vessels. The production of large molds of any known dielectric material capable of withstanding the heat which must be developed in the material without becoming deformed, and which is sufficiently strong to withstand the necessary handling is so expensive as to be prohibitive.

It is therefore the primary object of this invention to provide an electric field heating system which overcomes the above disadvantages.

It is a further object of this invention to provide an improved electric field heating apparatus for the production of large articles of moldable dielectric material.

It is a still further object of this invention to provide an improved apparatus for treating in an electric field a dielectric material of low electrical resistance.

A further object of this invention is to provide an improved electric field heating apparatus for heating liquid rubber latex in a closed mold.

A still further object of this invention is to provide an improved apparatus for molding liquid latex in a high frequency electric field.

In brief, the disadvantages of the prior art are overcome and the above objects accomplished by providing a closed mold having opposed top and bottom metal electrodes which are in contact with the latex and walls of a strong insulating material, such as wood. The applicator comprises a grounded metal plate and a high potential coupling plate mounted in spaced parallel relation to the grounded pate. An inductor is connected between these plates and serves to tune the applicator and for coupling the oscillator to the load. When the molds containing the liquid latex are placed successively between the applicator plates there is a capacity coupling between the coupling plate and the top electrode of the mold. The load then is equivalent to a resistance in series with a capacity, permitting a high voltage to be developed in the work circuit, so that an efficient transfer of energy into the latex is effected. Further, because of the direct capacity coupling to the mold electrode, no electrical connections to the mold are required, thus greatly simplifying handling.

Additional objects and advantages of this invention will become apparent from a further consideration of the invention which is described in detail in the following specification.

In the drawings,

Figure 1 is a sectional view of a mold;

Figure 2 is a sectional view of a modified form of mold particularly applicable to the production of automobile seats;

Figure 3 is a view partly in section, of the invention showing the mold between the applicator plates; and Figure 4 is a view illustrating the invention and showing a conveyor belt for moving the molds through the applicator.

In the example illustrated in Fig. 1, the mold is in the form of a rectangular box. The bottom electrode 1 preferably consists of a rugged metal plate of any suitable material such as steel, aluminum or the like. The walls 3, 5 of the mold are preferably made of a low loss material whose power factor is as nearly equal as possible to the power factor of the latex, and of low heat conductivity. Wood has been found to be satisfactory for this purpose, although any durable insulating material of similar characteristics may be employed. The four walls are attached to the plate 1 by hinges 7, 9, each side being separately hinged to permit them to open outwardly when the finished product is to be removed. The top of the mold consists of a metallic top electrode 11, removably held by gravity or fastened to the wooden walls by removable plugs or by wing-nuts 13, 15. The top electrode 11 may be perforated by a number of small holes to permit the escape of steam and other vapors. Two angle-metal brackets 17, 19 may be attached to the top surface of the top electrode. These extend along opposite sides of the mold and are provided with registered apertures into which a lifting rod 21 may be inserted at each end of the device.

Conventional core plugs 23 may be fastened to the top or bottom electrode by any conventional means to provide recesses in the finished article which add to its resilience. Metallic screws should be avoided, however, as they would tend to distort the electric field.

An alternative form of construction is illustrated in Fig. 2 in which the wooden walls 25 and 27 of the mold are shaped so as to form the resilient product into a shape suitable for use as an automobile seat, or the like. As before, a number of small apertures are provided in the top electrode 11, and which may extend through the adjacent portions of the wood side walls 25 and 27, to permit the escape of steam and other vapors. By forming the mold walls of wood, or material of similar electrical characteristics, greater uniformity of heating is achieved. It is desirable to establish an electric field which has a uniform potential gradient between the electrodes 1 and 11. Where the path between the electrodes is homogeneous, as it is where the latex is in contact with the electrodes, the potential gradient is constant. However, where the path includes two materials, near the thin edge of the seat, for example, the potential gradient depends on the relative dielectric constants of the two materials. A uniform potential gradient, and thus uniform heating, is obtained when the dielectric constants of the two materials are equal. Although the dielectric constant of liquid latex changes during the curing cycle, an average value may be used. Thus, when wood is employed, the potential gradient across any amount of thickness of the latex will be more uniform than when dissimilar materials are used, and the edges will be heated equally with the center portion. Wooden core plugs are used for the same reason.

Referring now to Fig. 3, a mold is shown in its operative position between the applicator plates by means of which heating currents are induced in the liquid latex. In this form of the invention the applicator comprises a grounded metal base plate 29 and a high potential coupling plate 31 which is fixedly mounted in spaced parallel relationship therewith by means of a number of stand-off insulators 33, 35 located at the four corners. Spacing between the base plate and the high potential coupling plate is greater than the overall height of the mold, so that the angle metal pieces 17 and 19 do not come in contact with the coupling plate 31, but the two plates are effectively in capacity coupled relationship for the effective transfer of power from the coupling plate to the load.

An inductor 37 is connected between the high potential coupling plate 31 and the grounded base plate 29. An oscillator 39 is coupled by a transmission line 41 to inductor 37 by means of an adjustable contact 43, or by means of a coupling coil not illustrated. Since the plates are of substantial size and the preferred frequency of operation is of the order of 13.6 megacycles, it may be desirable to prevent the establishment of a standing wave on the upper and lower plates. This may be effectively accomplished by connecting a second inductor 45 between the high potential coupling plate 31 and the grounded base plate 29 at the edges thereof remote from the oscillator. Additional inductors may be provided along the length of the opposed plates as necessary.

It will be observed that the work circuit includes inductor 37 connected effectively in parallel with the capacity between the high potential coupling plate 31 and the top electrode 11 of the mold, the capacity being in series with the electrical resistance of the liquid latex, which is in contact with the upper and lower electrodes. As a result, the electrical resistance of the latex does not effectively short-circuit the work circuit as is the case in the systems previously employed. The effective capacity between the high potential coupling plate 31 and the top electrode is preferably given such a value by proper design of the spacing between the two, that the effective inductance of the coil or coils connected between the applicator plates is tuned to a frequency somewhat above the frequency of operation. Since coil 37, or coil 37 in parallel with such other coils as may be employed, is not working into a low resistance load, it is possible to develop in the work circuit a high radio frequency potential difference which exists between the high potential coupling plate 31 and the top electrode 11. As is well known, circulating currents of extremely large magnitude flow through the shunt connected inductance and capacitance and thus through the latex, which is between the two electrodes 11 and 1. Consequently, a sufficient amount of heat is generated in the latex to bring it to the necessary temperature to cause it to coagulate and to form a relatively solid mass of a desired shape.

After treatment, the mold may be removed from the applicator, the top electrode removed from the mold, the side walls folded outwardly and the formed material readily removed.

It may be noted that in the mold illustrated in Fig. 3, the core plugs are shown fastened to the top electrode 11. This has one practical advantage, namely, that after the heat treatment has been completed, the top electrode may be raised by an overhead derrick or similar conveyor attached to the lifting rods 21, and the "blanket" will adhere to the core plugs sufficiently to cause it to be lifted out of the mold where it may be readily removed by pulling it from the core plugs and the upper electrode.

Fig. 4 shows a modification of this invention adapted for mass production. A grounded, metallic conveyor belt 47 is mounted in a table 49 and driven by a motor 51 so as to move along the length of the table. At a convenient location the high potential coupling plate 31 is fixedly mounted in spaced parallel relation above the conveyor belt and coupled to an oscillator in the manner illustrated in Fig. 3. The mold 52 may then be placed on the conveyor belt 47 after which it will be carried under the coupling plate 31 where the liquid latex will be heated in a manner described above. The length of the high potential electrode 31 in a direction parallel to the movement of the belt and/or the speed of the belt may be so adjusted that the mold is within the effective heating field a sufficient length of time to complete the operation. Afterward the mold is carried to the far end of the table where it may be removed for cooling or other processing as may be desired.

In order to provide free movement of the steam and other vapors arising from the mold during the heating process, the high potential coupling plate 31 may be perforated or may have the form of a wire screen or mesh. This will also prevent condensation of water vapor on the screen.

What I claim is:

1. A device for heating a moldable dielectric material comprising a closed mold having opposed top and bottom electrodes of electrically conductive material, the walls of said mold being electrically insulating, a grounded metal plate and a high potential coupling plate mounted in spaced relation to each other, the spacing between said plates being greater than the overall height of said mold whereby a capacity coupling exists between said top electrode and said high potential coupling plate when said mold is placed on said grounded plate between said two plates, means for establishing a high frequency potential difference between said plates, and an inductor connected between said plates, the effective capacity between said high potential coupling plate and said top electrode having such a value as to cause said capacity to resonate with said inductor at a frequency higher than the frequency of said high frequency potential.

2. A device for coagulating liquid latex comprising a closed mold to receive the liquid latex, said mold having (1) walls of insulating material, (2) a metallic bottom electrode and (3) a removable metallic top electrode, a grounded metal plate and a high potential coupling plate mounted in spaced relation to each other, the spacing between said plates being greater than the overall height of said mold whereby a capacity coupling exists between said metallic top electrode and said high potential plate when said mold is placed on said grounded plate between said two plates, means for establishing a high frequency potential difference between said plates, and an inductor connected between said plates, the effective capacity between said high potential coupling plate and said metallic top electrode having such a value as to cause said capacity to resonate with said inductor at a frequency higher than the frequency of said high frequency potential.

3. In a device for coagulating liquid latex the combination of a pair of spaced, parallel metallic plates, means for establishing a high frequency potential difference between said plates, and a closed mold adapted to be filled with said latex and placed between said plates, said mold having insulating walls supported by a metallic bottom electrode and a removable metallic top electrode, the spacing between said plates being greater than the overall height of said mold whereby, when said mold is placed on said grounded plate between said two plates, the metallic top electrode is capacitively coupled to the upper one of said plates, and an inductor connected between said plates, the effective capacity between the upper of said plates and said metallic top electrode in series with the effective resistance of said latex in parallel with said inductor being of such a value as to cause said capacity and inductor to resonate at a frequency higher than the frequency of said high frequency potential.

4. In a device for coagulating liquid latex to form an article of predetermined shape, the combination of an oscillator; a grounded metallic conveyor carrying one or more liquid latex molds to be coupled to said oscillator, a metallic plate supported above said conveyor in spaced parallel relation thereto, an inductor connected between ground and said metallic plate, means coupling said inductor to said oscillator for establishing a high frequency alternating potential difference between said grounded conveyor and said plate; said mold comprising insulating walls, a metallic bottom electrode and a removable top electrode; said top electrode being capacitively coupled to said metallic plate as said conveyor advances said mold into cooperative relation therewith, the effective capacity between said metallic plate and said top electrode and the inductance of said inductor having values selected to be resonant at a frequency higher than the frequency of said alternating potential, the advance of said mold into cooperative relation with said metallic plate serving to cause a high frequency heating current to flow between said electrodes and to heat the latex in said mold.

5. A device of the character described in claim 4 in which said metallic plate and said removable top electrode are perforated.

HARRY W. TAYLOR.

REFERENCES CITED

The following references are of record in the file of this patent:

UNITED STATES PATENTS

| Number | Name | Date |
|---|---|---|
| 2,133,810 | Craigue | Oct. 18, 1938 |
| 2,248,840 | Wilkoff | July 8, 1941 |
| 2,288,268 | Crandell | June 30, 1942 |
| 2,304,958 | Rouy | Dec. 15, 1942 |
| 2,308,043 | Bierwirth | Jan. 12, 1943 |
| 2,325,637 | Stewart | Aug. 3, 1943 |
| 2,341,617 | Hull | Feb. 15, 1944 |
| 2,421,101 | Lakso | May 27, 1947 |
| 2,436,732 | Rowe | Feb. 24, 1948 |
| 2,467,285 | Young et al. | Apr. 12, 1949 |